US009290963B2

(12) United States Patent
Berger et al.

(10) Patent No.: US 9,290,963 B2
(45) Date of Patent: Mar. 22, 2016

(54) DOOR LEVER AND KEY CYLINDER LOCK COMBINATION

(71) Applicant: Securitech Group, Inc.

(72) Inventors: Mark J. Berger, New York, NY (US); Jeffrey Regen, Riverhead, NY (US)

(73) Assignee: SECURITECH GROUP, INC., Maspeth, NY (US)

( * ) Notice: Subject to any disclaimer, the term of this patent is extended or adjusted under 35 U.S.C. 154(b) by 0 days.

(21) Appl. No.: 14/216,329

(22) Filed: Mar. 17, 2014

(65) Prior Publication Data

US 2014/0311194 A1 Oct. 23, 2014

Related U.S. Application Data

(60) Provisional application No. 61/791,680, filed on Mar. 15, 2013.

(51) Int. Cl.

*B60R 25/02* (2013.01)
*E05B 1/00* (2006.01)
*E05B 13/10* (2006.01)

(52) U.S. Cl.

CPC ............... *E05B 1/003* (2013.01); *E05B 13/106* (2013.01); *Y10T 70/5199* (2015.04)

(58) Field of Classification Search

USPC ....................... 70/91, 95–100, 208–210, 224; 292/336.3

See application file for complete search history.

(56) References Cited

U.S. PATENT DOCUMENTS

| | | | | | |
|---|---|---|---|---|---|
| RE24,443 | E | * | 3/1958 | Labrie | E05B 65/0811 70/96 |
| 3,019,632 | A | * | 2/1962 | Russell | 70/224 |
| 5,303,965 | A | * | 4/1994 | Meehan | 292/336.3 |
| 6,460,906 | B2 | * | 10/2002 | Bingle et al. | 292/336.3 |
| 6,519,984 | B1 | * | 2/2003 | Morris | 70/208 |
| 7,013,687 | B2 | * | 3/2006 | Shedd et al. | 70/100 |
| 7,401,484 | B1 | * | 7/2008 | Holmes et al. | 292/336.3 |
| 8,220,300 | B2 | * | 7/2012 | Lee | 70/224 |
| D690,577 | S | * | 10/2013 | Eller et al. | D8/331 |
| 8,584,494 | B2 | * | 11/2013 | Salvatore et al. | 70/91 |
| 8,777,282 | B1 | * | 7/2014 | Shilts | 292/347 |
| 2010/0013248 | A1 | * | 1/2010 | Keller | E05B 1/0007 292/347 |
| 2010/0126239 | A1 | * | 5/2010 | Berger | 70/92 |

* cited by examiner

*Primary Examiner* — Christopher Boswell

(74) *Attorney, Agent, or Firm* — Abelman, Frayne & Schwab

(57) ABSTRACT

A door lever and mounting plate assembly attachable to a door and coupleable to a latch and spindle assembly in the door, including a. a mounting plate including an aperture therein mountable on the door with the aperture axially aligned with the spindle,
b. a door lever assembly comprising a handle part with a bottom surface, and a pivot plate, the handle part being coupleable to the spindle, and the pivot plate being fixed to the bottom surface of the handle and having an area greater than the area of the aperture and being situated closely adjacent and underlying the aperture, such that when the handle is pivoted the aperture is at all times fully underlied by at least parts of the pivot plate, and
d. a keylock cylinder mounted in the handle part with a linkage to engage and control rotation of the spindle.

9 Claims, 9 Drawing Sheets

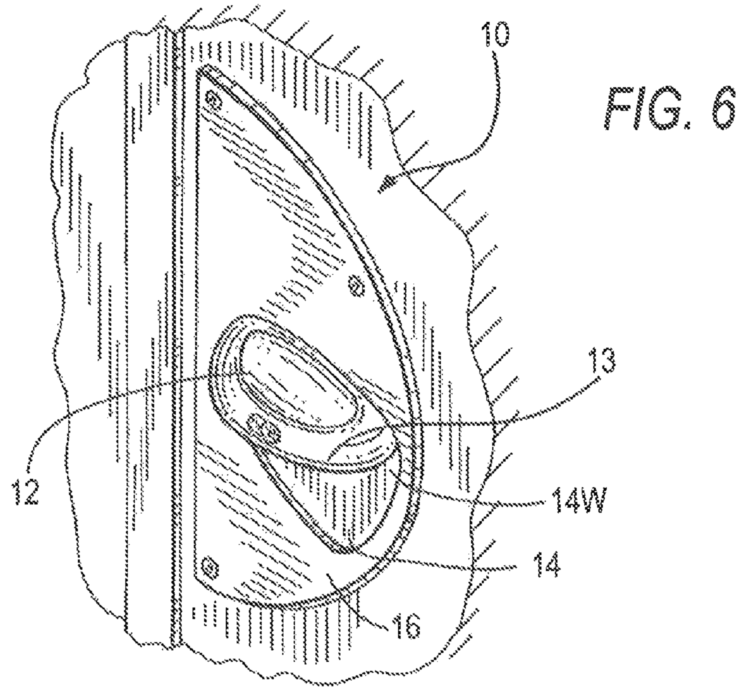
FIG. 6
FIG. 7
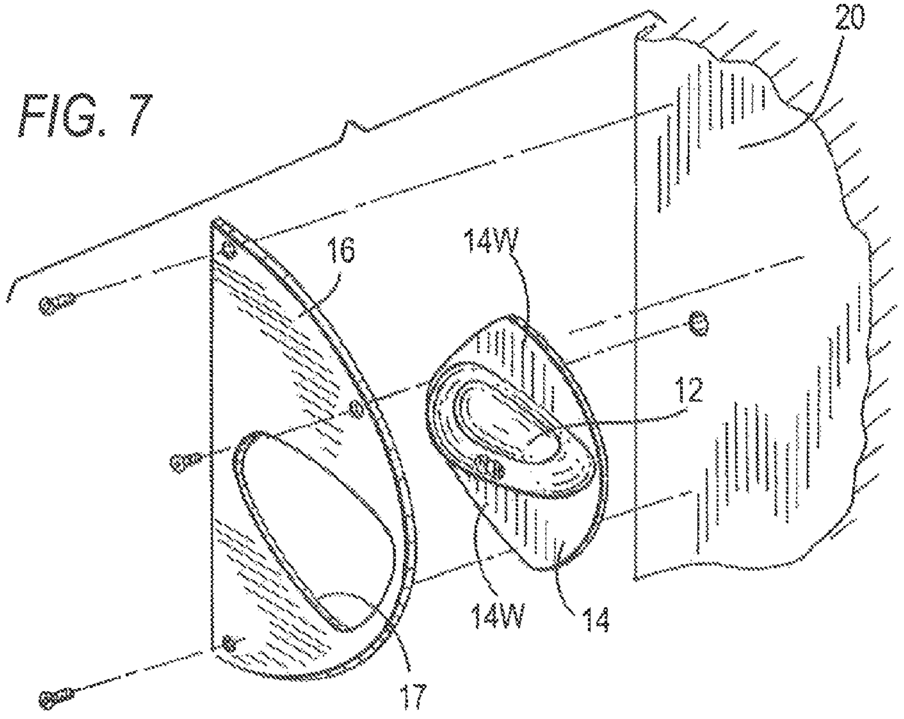

FIG. 10
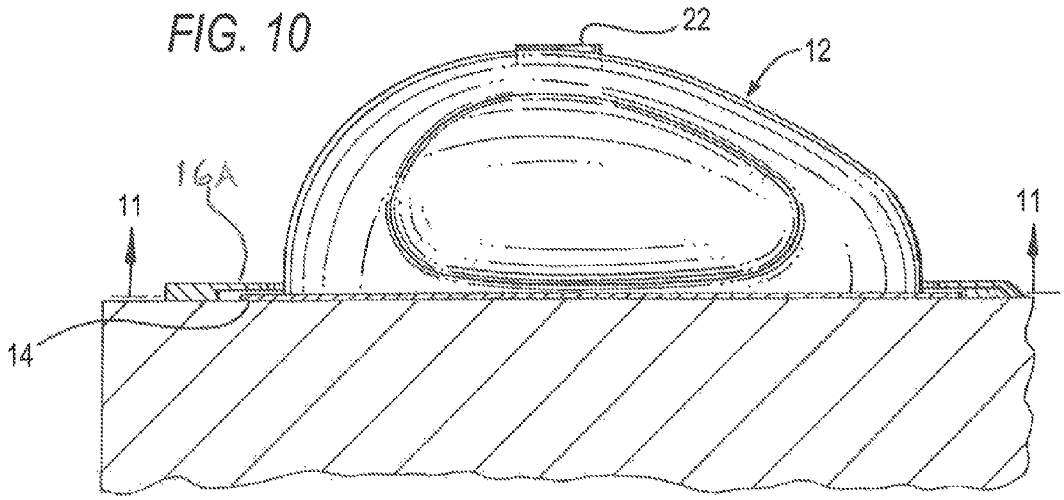
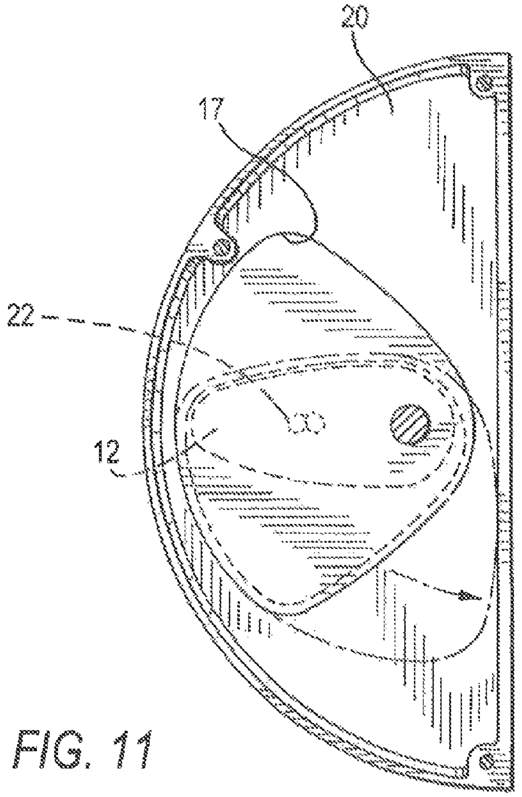
FIG. 11

FIG. 16
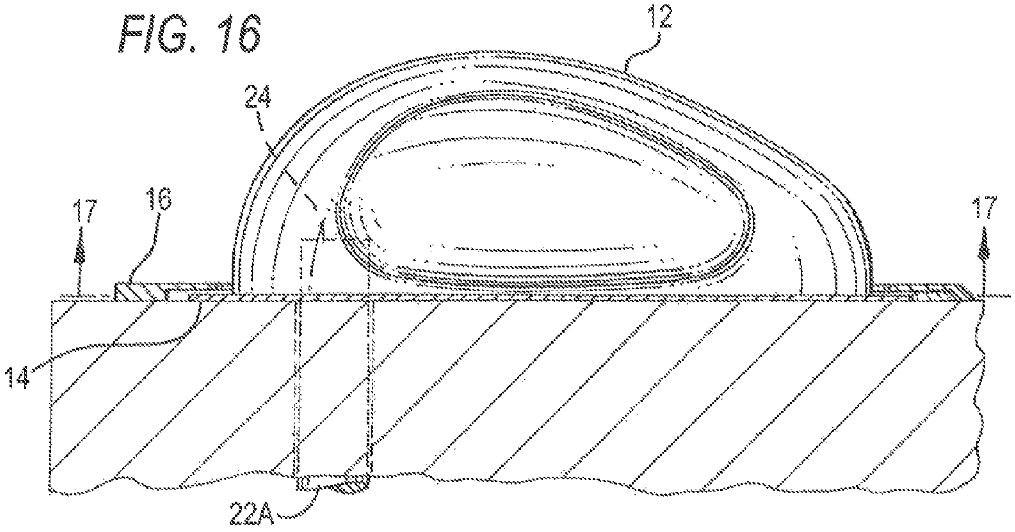
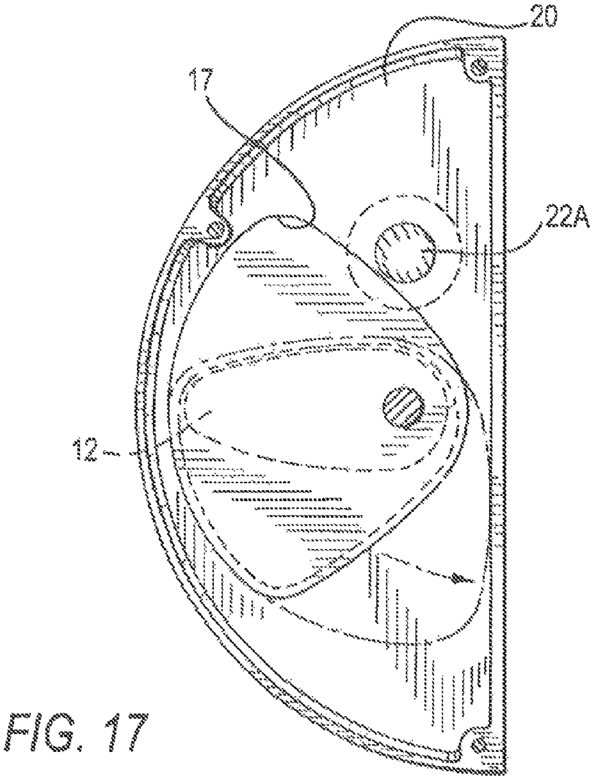
FIG. 17

DOOR LEVER AND KEY CYLINDER LOCK COMBINATION

RELATED CASE

This application claims priority under 35 USC Sections 119 and/or 120 of Provisional Patent Application Ser. 61/797,680 filed Mar. 15, 2013 the contents of which is incorporated herein by reference.

BACKGROUND

1. Field of the Invention

This invention is in the field of door lever assemblies including door levers associated with a key lock cylinders and particularly door levers for security doors and for doors of residential rooms in mental institutions where patients reside.

2. Background and Prior Art

Doors employing pivoting door levers or push bars typically have key lock cylinders that are mounted independently of the latch and bolt mechanism, or may be mounted in the latch mechanism to restrict opening of a door. This invention relates particularly to a serious problem where certain patients in behavioral health care facilities or psychiatric institutions try to commit suicide by hanging themselves with a cord or other ligature form looped over the top of a door and secured to a handle or knob of the door to the patient's room. The present invention relates to methods and apparatus seeking to prevent such attempted suicides. Reasons for such behavior are complex and not the subject of the present invention; however, significant numbers of attempts do occur, and significant numbers of patients are committed into these institutions for the very reason that they are known to be candidates for suicide attempts. These institutions are supposed to be environments for treatment of these and other problems and for prevention of patients from achieving suicide.

While the methods employed for the attempted suicides vary with the available environment and creativity of the patients, the present invention is concerned with attempts by hanging with a cord, belt or other item with the near or proximal portion of the cord wrapped around the door knob, lever or other handle of a door. The cord is then draped over the top of the door and the distal or remote end of the cord, belt, twisted bed sheet or other item on the interior side of the door is formed into the suicidal noose.

In typical psychiatric institutions the patients' activities, as regards personal safety and behavior in general, are monitored carefully by staff; however, it is also common for patients to have private rooms with unlocked doors for them to come and go generally as they please. It is in these kinds of situations where a patient has periods of relative privacy and domain over his or her door, when a suicide attempt can be made without immediate awareness of institution staff, and with enough time for the suicide to be successful before staff action can be taken. For various reasons there are surprisingly high numbers of attempted and successful suicides in psychiatric institutions that are not generally publicized or known, but administrators of these institutions are quite aware and concerned. The present invention addresses these tragedies and presents a practical apparatus believed to be able to significantly reduce the problem on a nationwide basis.

Attempts have been made to prevent or defeat the above-described efforts at suicide by hanging, by designing the doorknob such that a ligature will not securely engage or connect to the doorknob, and consequently will slide off the door knob or lever, such that the opposite end of the ligature cannot support any body weight and suicide will be defeated.

Conventional door levers comprise an elongated handle which pivots about an axis near one end of the lever. With such a design it is obviously quite easy to loop the remote end of a ligature around the shaft of the lever and around the elongated lever itself. One proposed solution, such as seen in applicant's own pending non-provisional application Ser. No. 12/590,135 incorporated herein by reference, includes a partially conical form of the lever in the area of the pivot and a downward tapered shape of the handle portion of the lever. This design has been partially successful to reduce success in suicide attempts where a ligature is draped over the top of a door and extends down to the lever. However, there remain some situations where the ligature can become wedged in the area of the pivot or shaft connection at the base of the handle, namely wedged between the bottom surface of the handle and the surface of the door.

The present invention provides a new design of door lever which will prevent the latest nuance of possible wedging a ligature in the door handle assembly and will allow new benefits of having a key lock cylinder situated in the door lever itself.

SUMMARY AND OBJECTS OF THE NEW INVENTION

A first object is to provide a pivoting door lever in the general shape of a computer mouse which includes a lock cylinder in the body of the lever.

A further object is to provide a pivoting lever as described above where the keylock cylinder is mounted in the door lever and coupled with the main spindle coupled to the locking bolt.

A still further object is to provide a pivoting door lever as described above which includes (a) a mounting plate attachable to an exposed surface of a door, which mounting plate has a cut-out or aperture or window, and (b) a second plate attached to the base of the pivoting lever, the second plate pivoting with the lever and closely and always underlying said aperture regardless of the pivotal movement of said lever.

A further object is to provide a new door lever as described above where there is no gap or access between the base of the lever and the surface of the door into which a ligature could be wedged.

An additional object is to provide a new door lever as described above where there is no gap between the bottom of the escutcheon or collar and the surface of the door.

Another object is to provide a new design of exit door lever where the handle and stem portions define on the top a smooth elongated mouse-like shape which has an elongated smooth hump top surface to which a ligature cannot attach because such ligature would simply slide off.

A further object is to eliminate the conventional gap between the bottom surface of the lever or mouse shape lever in this case, and the door surface.

An additional object is to eliminate said conventional gap by employing a mounting plate with an aperture, and securing a flat pivot plate to the bottom surface of the stem of the lever, where said pivot plate has area greater than that of the aperture, and at all times this pivot plate underlies the aperture.

The new lever assembly comprises the mouse-like shaped handle and an attached pivot plate secured below the bottom surface of the mouse handle as described above, and a larger face plate below the pivot plate, the larger face plate being secured to the door surface and the face plate has an aperture therethrough or window, and the mouse handle portion extends upward through that window while the pivot plate is at all times below the face plate and closely underlying the face plate. The mouse handle can be pivoted and moves from a typical horizontal latched position to an activated downward inclined position. During all pivoting motions the pivot plate remains closely underlying the face plate surface so that there is no visible or viable gap into which a ligature could be stuffed or wedged.

The mouse shape lever itself has all rounded and tapered surfaces so that any ligature in contact with it could only slide off and thus could not be secured to this lever as a anchor to support the ligature's opposite end formed as a noose. The mouse lever is somewhat elongated to be readily grasped by person's hand and pivoted or twisted downward in the normal manner to open the door. A pivoting movement of about 15 to 20° is usually sufficient to activate the latch mechanism for opening the door.

The face plate mounted to the door is typically a thin but strong rigid metal of thickness about one eighth inch, and the pivot plate is a similar thin metal plate which is rigid and strong enough to resist any attempts at dismantling or deforming it. Various conventional metal or plastic materials may be selected for their characteristics of strength, appearance and durability.

In a conventional manner the key lock cylinder is mounted on and extends through the face plate, being positioned generally near the lever, and in this case is slightly above the lever for access and visibility. This lock cylinder would extend through a hole in the face plate and thence into the main body of the door to the locking mechanism.

The objects are further set forth in the following examples.

1. A door, latch and lever combination comprising:
   a. a door,
   b. a door latch assembly including a spindle extending therefrom, mounted in said door,
   c. a door lever assembly comprising:
      i. a mounting plate including an aperture therein of area A mountable on said door with said aperture axially aligned with said spindle to extend through said aperture, and
      ii. a handle part with a bottom surface and a pivot plate, said handle part being coupleable to said spindle, and said pivot plate fixed to said bottom surface of said handle and having an area greater than area A of said aperture and being situated closely adjacent and underlying said aperture, such that when the handle is pivoted said aperture is at all times fully underlied by at least parts of said pivot plate, and
   d. a keylock cylinder mounted in said handle part with a linkage to engage and control rotation of said spindle.
2. A door lever and mounting plate assembly attachable to a door for coupleable with a latch and spindle assembly in said door, comprising:
   a. a mounting plate including an aperture therein of area A mountable on said door with said aperture axially aligned with said spindle,
   b. a door lever assembly comprising a handle part with a bottom surface, and a pivot plate, said handle part being coupleable to said spindle, and said pivot plate being fixed to said bottom surface of said handle and having an area greater than the area A of said aperture and being situated closely adjacent and underlying said aperture, such that when the handle is pivoted said aperture is at all times fully underlied by at least parts of said pivot plate, and
   c. a keylock cylinder mounted in said handle part with a linkage to engage and control rotation of said spindle.
3. The lever and mounting plate combination according to claim 2 wherein said aperture has a generally trapezoidal shape.
4. The lever and mounting plate combination according to claim 3 wherein said generally trapezoidal shape has curved convex top and bottom edges.
5. The lever and mounting plate combination according to claim 2 wherein said handle has shape that simulates the appearance of a computer mouse with a convex rounded head end and a convex rounded tail end which is smaller than said head end, and has converging sides between said head and tail ends.
6. The lever and mounting plate combination according to claim 5 wherein said lever has a curved upper surface that tapers downward from head to tail ends.
7. The lever and mounting plate combination according to claim 6 wherein said lever has side surfaces with elongated inward recesses adapted to receive as user's thumb and finger tips for ease of pivoting said lever.
8. The lever and mounting plate combination according to claim 2 further comprising a second aperture in said mounting plate through which is insertable a key lock cylinder.
9. The lever and mounting plate combination according to claim 2 wherein said lever is elongated with opposite head and tail ends and with said head end adapted to couple with said spindle.

BRIEF DESCRIPTION OF THE DRAWINGS

FIG. 6 is a perspective view of the lever assembly of FIGS. 1, 4 and 5, FIG. 7 is an exploded perspective view showing the lever and keylock combination of FIGS. 1-6 in an assembled state, FIG. 10 is a fragmentary sectional view taken along lines 10-10 in FIG. 8 showing the new lever assembly mounted to a door, FIG. 11 is a bottom plan view of the new lever assembly taken along line 11-11 and FIG. 10 showing the bottom surfaces of the pivot plate and of the main plate.

FIG. 16 is similar to FIG. 10 for the embodiments of FIGS. 12 and 13, and FIG. 17 is similar to FIG. 11 for the embodiments of FIGS. 12 and 13.

DETAILED DESCRIPTION OF THE PREFERRED EMBODIMENTS

Figure 3:
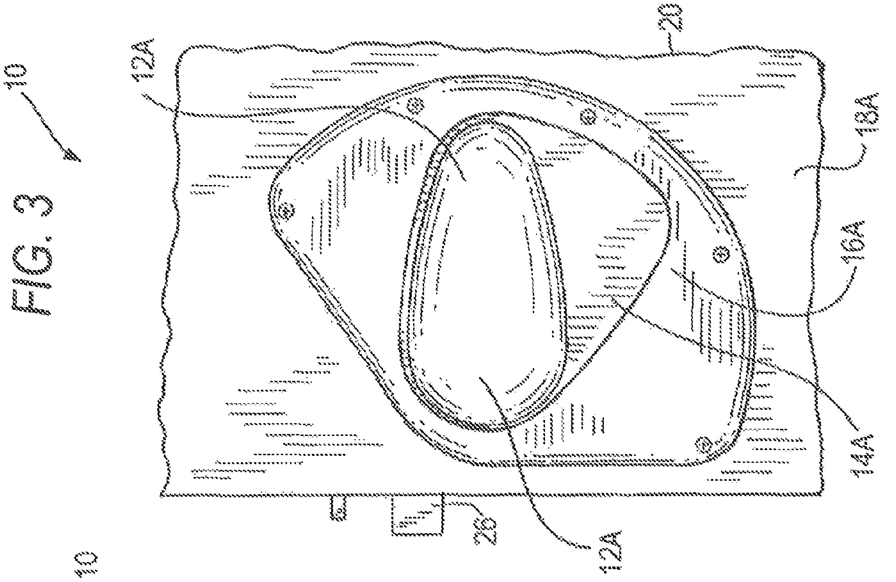
FIG. 3 is a rear elevation view similar to FIG. 1, showing the door lever without the keylock combination on the opposite side of the door.

The first embodiment of the new door lever and key cylinder lock combination is illustrated in the drawings in FIGS. 1-11, and the second embodiment is illustrated in FIGS. 12-17.

Figure 2:
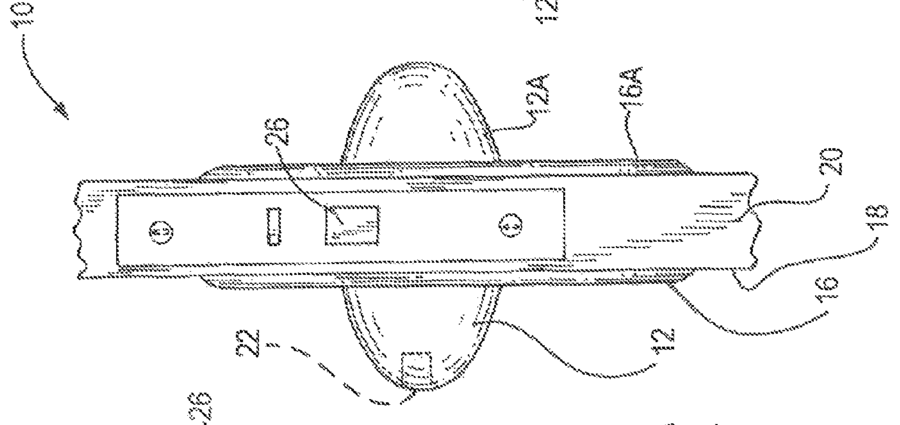
FIG. 2 is an elevation view of the edge of the door in FIG. 1.
Figure 1:
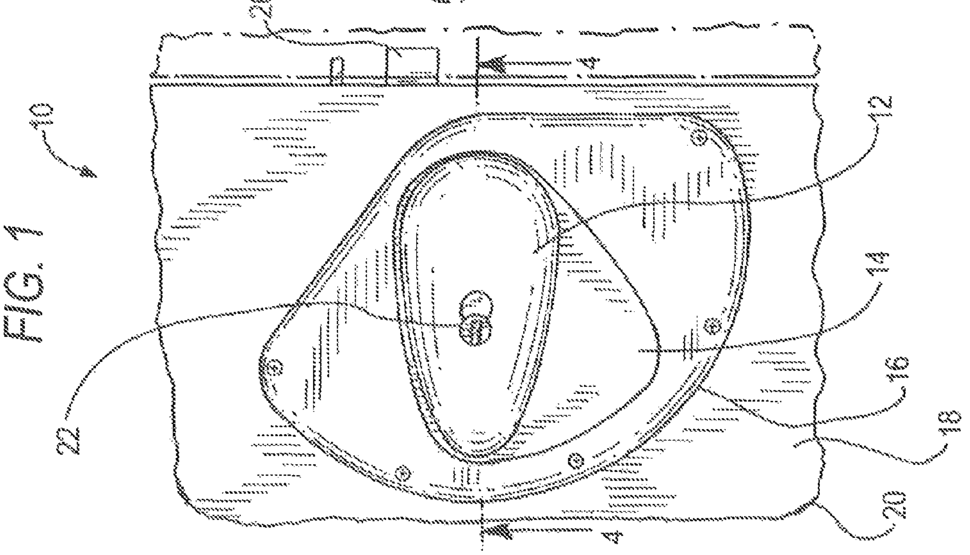
FIG. 1 is a fragmentary front elevation view of the new door lever and key cylinder lock combination that includes a keylock cylinder in the lever.

FIGS. 1-3 show the new door lever and keylock combination assembly 10 including the mouse shaped lever 12 the pivot plate 14 associated with lever 12, the mounting plate 16 secured to the outer surface 18 of door 20. Lever 12 may be alternatively described as having the shape of an avocado or eggshell sliced in half along its longitudinal axis with the convex outer surface that is broader at one end than the other. This is apparent from viewing FIGS. 1-3 of the drawings.

FIG. 3 shows the corresponding lever 12A pivot plate 14A and mounting plate 16A secured to the inner surface 18A of the door facing the interior of a patient's room.

FIG. 2 illustrates lever 12 and mounting plate 16 on the external side 18 of door 20, and also shows lever 12A and its mounting plate 16A on the internal side 18A of door 20. FIGS. 1 and 2 further show keylock cylinder 22 mounted in lever 12

Figure 4:
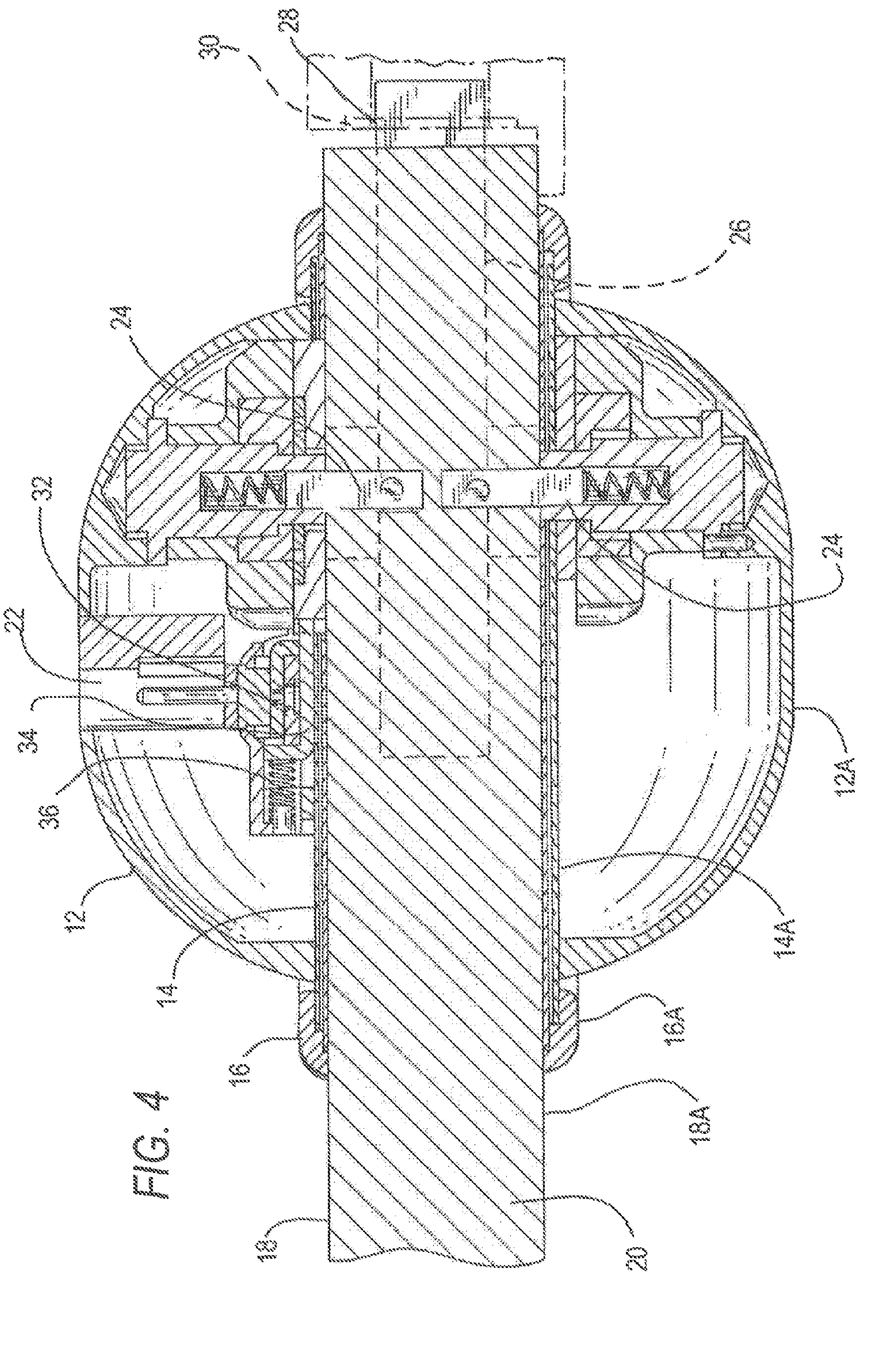
FIG. 4 is a fragmentary sectional view taken along line 4-4 in FIG. 1.

FIG. 4 shows in cross-section new lever 12, with its keylock cylinder 22 on the external side 18 of door 20, and corresponding lever 12A, mounting plate 16 a on the inner surface 18A of door 20. Also seen in FIG. 4, below mounting plate 16 is pivot plate 14 fixed to and pivoting with lever 12, and correspondingly pivot plate 14A secured to and pivoting with lever 12A where pivot plate 14A is shown to overlie mounting plate 16A. Coupled to both levers 12 and 12A are elements spindle 24 that extends through door 20 and engage bolt 26 which can be driven axially to extend into and through aperture 28 of strike plate 30. Keylock cylinder 22 is coupled to linkage 32 in a conventional manner and described in more detail later, which can engage spindle elements 24 to allow or disallow the spindle to be rotated by levers 12, 12A.

Figure 5:
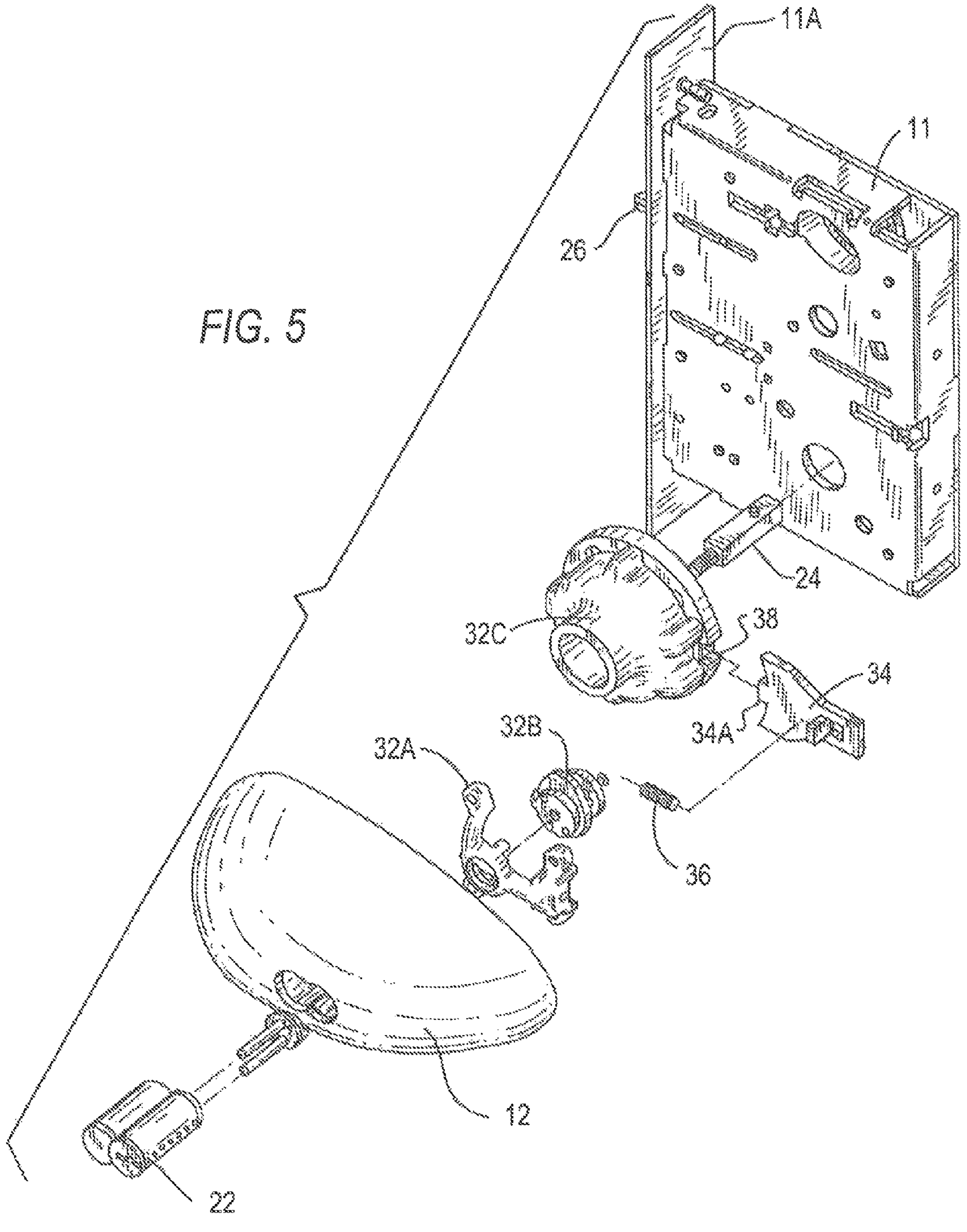
FIG. 5 is an exploded perspective view of the lever shown in FIGS. 1 and 4.
Figure 9:
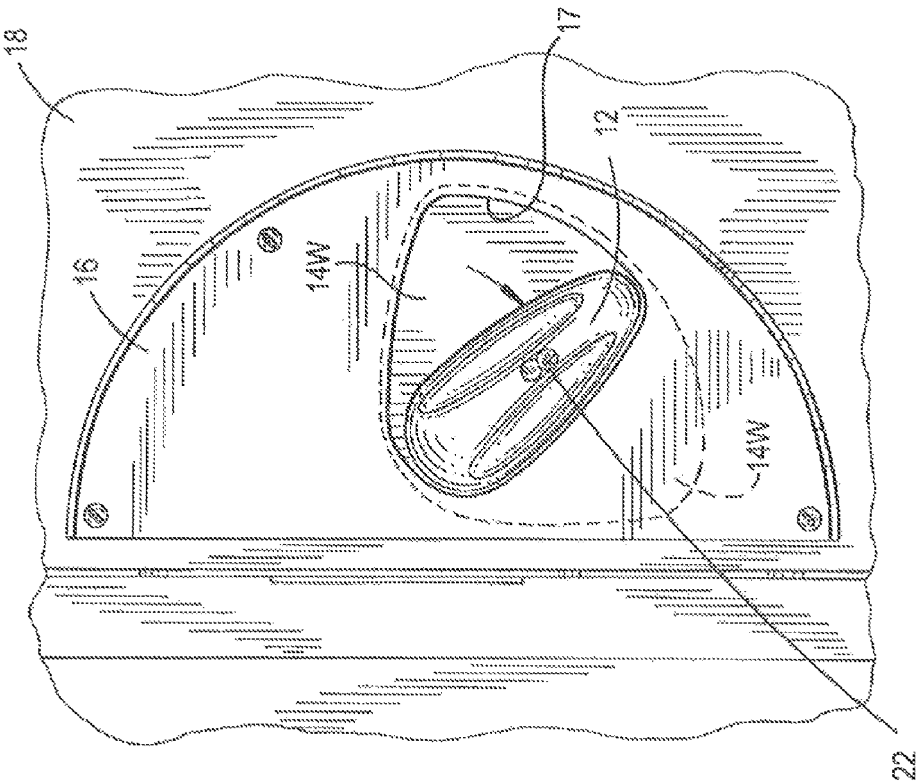
FIG. 9 is similar to FIG. 8 and shows the door lever pivoted to its downward inclined open or unlatch position.
Figure 8:
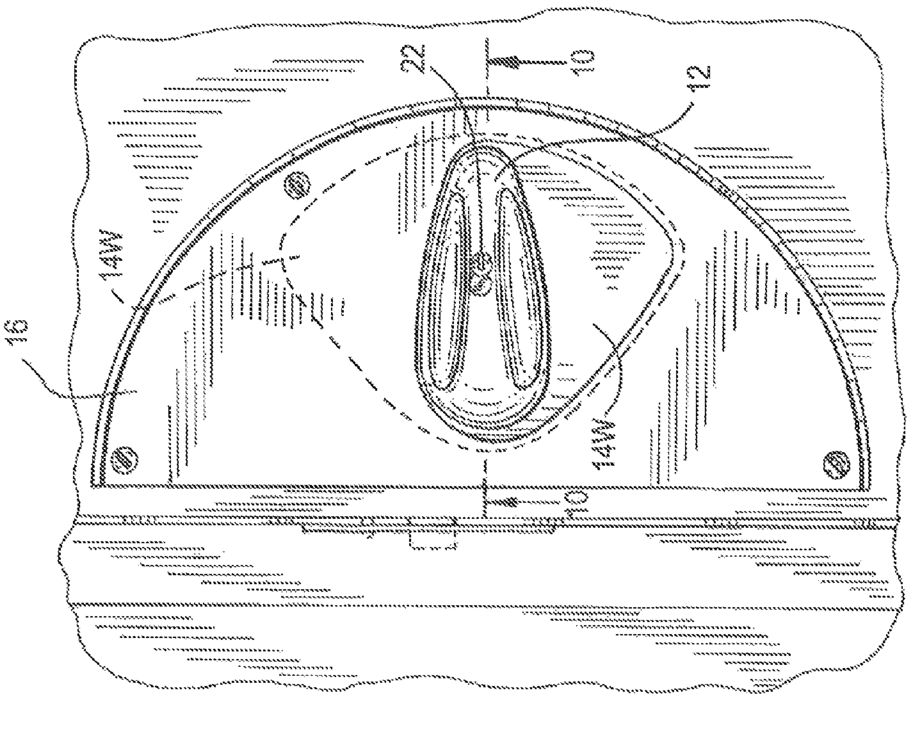
FIG. 8 is a front elevation view of the door lever assembly mounted to a door and shown with the handle in its generally horizontal latched position.
Figure 12:
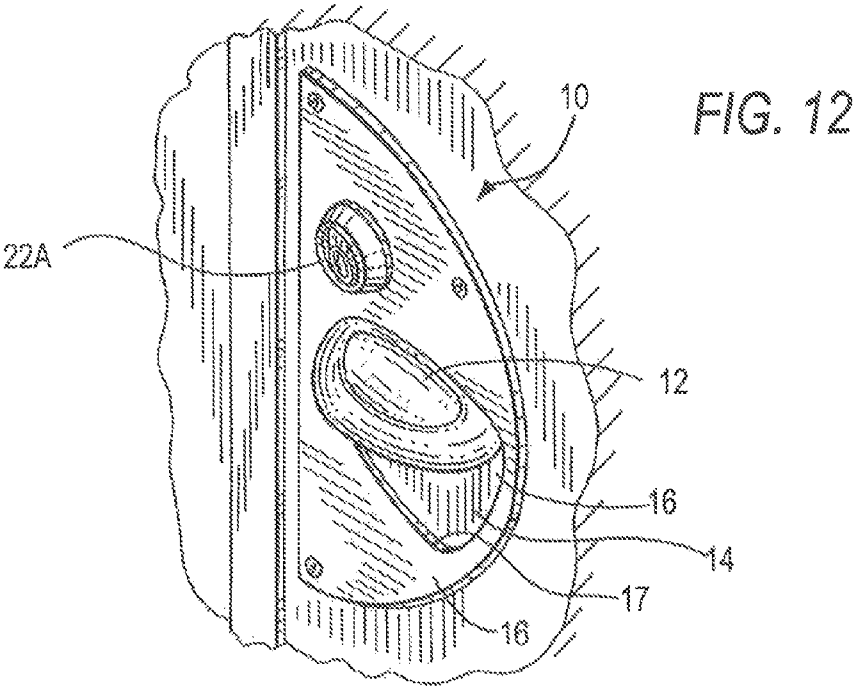
FIG. 12 is a fragmentary perspective view of a $2^{nd}$ embodiment of the present invention.
Figure 13:
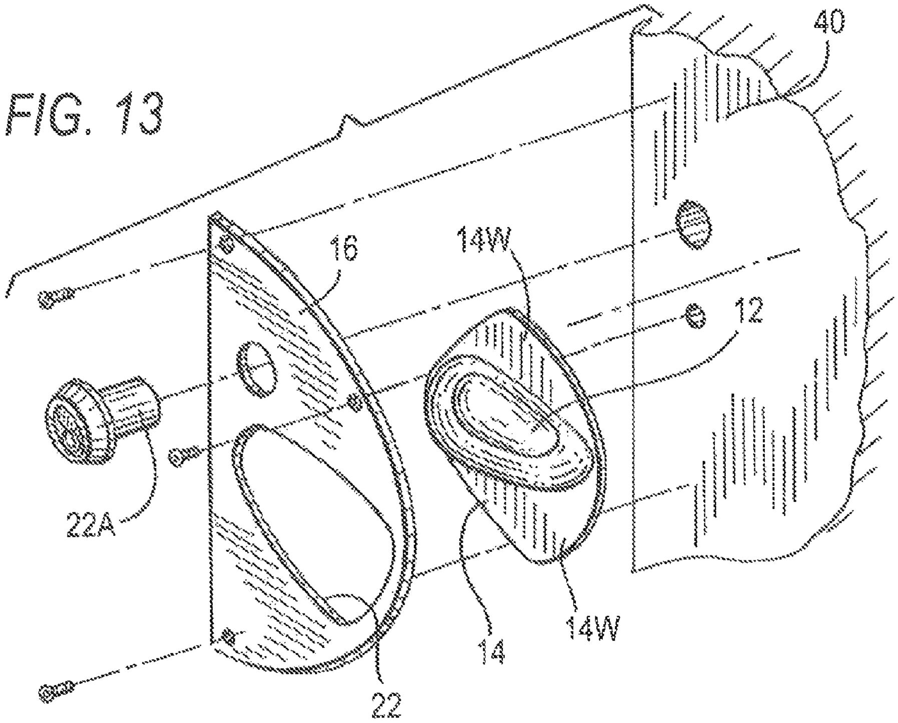
FIG. 13 is an exploded perspective view of the door lever assembly of FIG. 12.
Figure 15:
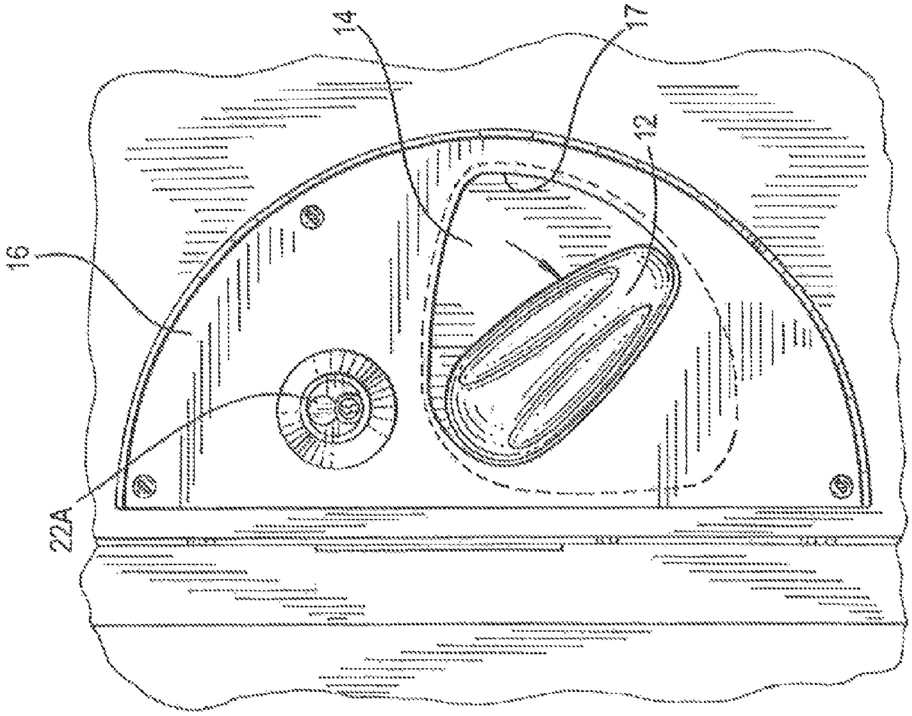
FIG. 15 is similar to FIG. 9 for the embodiments of FIGS. 12 and 13.
Figure 14:
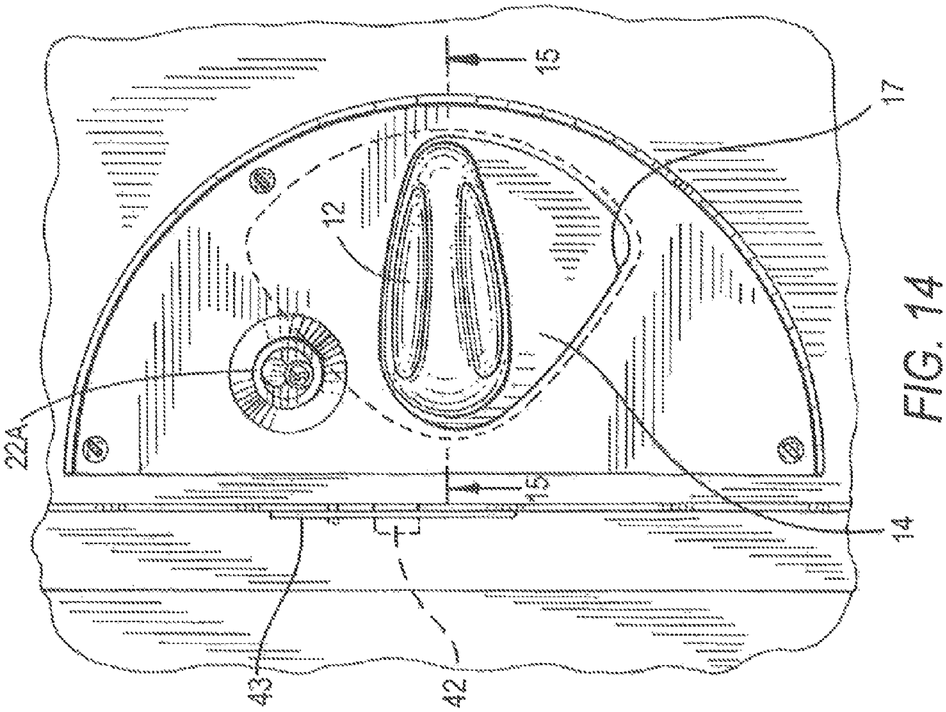
FIG. 14 is similar to FIG. 8 for the embodiment of FIGS. 12 and 13.

The new door lever 12 and incorporated keylock cylinder assembly is further illustrated in the exploded view in FIG. 5, showing housing 11 mountable in the recess of a door inward of faceplate 11A, lever 12, keylock cylinder 22, which is coupled through linkage components to allow or disallow spindle 24 to be rotated by lever 12 or 12A. As noted above, rotation of spindle 24 will pull bolt 26 (seen in FIGS. 1-4) to its retracted position so that the door can be opened.

The linkage between lever 12 and spindle 24 is exemplified by conventional components seen in FIGS. 4 and 5 as follows. Lever 12 when coupled through link parts 32A, 32B, and 32C will allow rotation of lever 12 to rotate spindle 24 to drive bolt 26 to its retracted position to open the door. Lock plate 34 is biased by spring 36 which urges finger 34A to engage into recess 38 where it prevents rotation of collar 32C and therefore blocks rotation of the lever and the spindle 24. By key action of lock cylinder 22, lock plate 34 is moved away from collar 32 allowing rotation of lever 12 to open the door. Thus, spring 36 normally biases lock plate 34 to bar rotation of the lever to open the door; however by keylock operation element 32B can be rotated, and by its camming action will drive lock plate 34 out of engagement with collar 32C.

This embodiment illustrates the novelty of incorporating a keylock cylinder into the mouse lever itself, and particularly in this case the anti-ligature lever 12 which has a rounded and sloped shape to defeat attempts by a patient to loop and engaged a ligature onto a door lever. With this shape a ligature would simply slide off any portion of lever it contacts. A further anti-ligature feature of this lever is pivotable plate 14 underlying mounting plate 16 such that no ligature can be jammed between the side or bottom surface of lever 12 or the surface of the door or any escutcheon equivalent between a lever and the door surface. Even a thin ligature could not be wedged under the lever because the pivot plate 14 has wing sections 14W (see FIG. 7) that are always closely underlying mounting plate 16. This cooperation between the pivot plate 14, aperture or window 17 (FIG. 7), and mounting plate 16 ensures that aperture 17 is at all times covered by some overlying portion of mounting plate 16, thus barring a patient from wedging a ligature between the plates 14 and 16.

FIGS. 6-11 in additional views further illustrate the apparatus of FIGS. 1-5 and FIGS. 12-17 illustrate essentially the same mouse shape lever 12 without keylock cylinder Incorporated into the body of the mouse lever 12, but with a keylock cylinder 22A adjacent and slightly above the lever 12 and extending through window 17 in mounting plate 16 with conventional coupling to optionally allow or disallow rotation of spindle. Besides the separate keylock cylinder, the mouse shape lever 12 with its pivot plate 14 underlying a mounting plate 16 is essentially the same as the anti-ligature lever described above as the first embodiment herein.

Although the best mode for carrying out the present invention has been described in the foregoing detailed description and illustrated in the accompanying drawings, it will be understood that the invention is not limited to the embodiments disclosed but is capable of numerous rearrangements, modifications and substitutions of steps and elements without departing from the spirit of the invention. Accordingly the present invention is intended to encompass such arrangements, modifications and substitutions of steps and elements as falls within the scope of the claims.

The invention claimed is:

1. A door, latch and lever combination comprising:

a. a door having an exposed outer surface, b. a door latch assembly including a spindle extending therefrom, mounted in said door, c. a door lever assembly comprising:

i. a mounting plate including an aperture therein of area A mountable on the exposed outer surface of said door with said aperture axially aligned with said spindle that will extend through said aperture, and ii. a handle part with opposite top and bottom surfaces and a pivot plate, said handle part being coupleable through its bottom surface to said spindle, and said pivot plate fixed to said bottom surface of said handle and having an area greater than area A of said aperture and being situated sandwiched between said mounting plate and said door and closely adjacent and underlying said aperture, such that when the handle is pivoted said aperture is at all times completely covered by at least parts of said pivot plate, and d. a keylock cylinder mounted in said handle part with a linkage to engage and control rotation of said spindle.

2. A door lever and mounting plate assembly attachable to a door having an exposed outer surface for coupleable with a latch and spindle assembly in said door, comprising:

a. a mounting plate including an aperture therein of area A mountable on the exposed outside face of said door with said aperture axially aligned with said spindle, b. a door lever assembly comprising, i. a handle part with opposite top and bottom surfaces, and a pivot plate, ii. said handle part being coupleable through its bottom surface to said spindle, iii. and said pivot plate being fixed to said bottom surface of said handle and having an area greater than the area A of said aperture, and being situated sandwiched between said mounting plate and said door and closely adjacent and underlying said aperture in said mounting plate, such that when the handle is pivoted said aperture is at all times completely covered by at least parts of said pivot plate, and iv. a keylock cylinder mounted in said handle part where said keylock cylinder extends from said top surface of said handle part inward toward said bottom surface, with a linkage to engage and control rotation of said spindle.

3. The lever and mounting plate combination according to claim 2 wherein said aperture has a generally trapezoidal shape.

4. The lever and mounting plate combination according to claim 3 wherein said generally trapezoidal shape has curved convex top and bottom edges.

5. The lever and mounting plate combination according to claim 2 wherein said handle has shape that simulates the appearance of an avocado or eggshell sliced in half along its longitudinal axis with the convex outer surface that is broader at one end than the other.

6. The lever and mounting plate combination according to claim 5 wherein said lever has a curved upper surface that tapers downward from head to tail ends.

7. The lever and mounting plate combination according to claim 6 wherein said lever has side surfaces with elongated inward recesses adapted to receive as user's thumb and finger tips for ease of pivoting said lever.

8. The lever and mounting plate combination according to claim 2 further comprising a second aperture in said mounting plate through which is insertable a key lock cylinder.

9. The lever and mounting plate combination according to claim 2 wherein said lever is elongated with opposite head and tail ends and with said head end adapted to couple with said spindle.

* * * * *